US012164284B2

(12) United States Patent
Alt et al.

(10) Patent No.: US 12,164,284 B2
(45) Date of Patent: Dec. 10, 2024

(54) METHOD FOR ENABLING INDUSTRIAL COLLECTOR TO SEND TELEMETRY DATA TO MULTIPLE CONSUMERS

(71) Applicant: ABB SCHWEIZ AG, Baden (CH)

(72) Inventors: Jean-Christophe Alt, Eaubonne (FR); Suresh Kumar, Bangalore (IN); Roger Kullang, Vasteras (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/030,251

(22) PCT Filed: Oct. 5, 2020

(86) PCT No.: PCT/EP2020/077808
§ 371 (c)(1),
(2) Date: Apr. 4, 2023

(87) PCT Pub. No.: WO2022/073578
PCT Pub. Date: Apr. 14, 2022

(65) Prior Publication Data
US 2023/0376015 A1 Nov. 23, 2023

(51) Int. Cl.
*H04L 67/12* (2022.01)
*G05B 19/418* (2006.01)
*H04L 47/70* (2022.01)

(52) U.S. Cl.
CPC ..... *G05B 19/4185* (2013.01); *G05B 19/4183* (2013.01); *H04L 67/12* (2013.01); *H04L 47/827* (2013.01)

(58) Field of Classification Search
CPC ..... H04L 67/12; H04L 47/827; G06F 9/5072; G06F 9/541; G06B 19/4185; G06B 19/4183
See application file for complete search history.

(56) References Cited

U.S. PATENT DOCUMENTS

| 2008/0247549 A1* | 10/2008 | Blanc | B25J 9/1674 |
| | | | 380/277 |
| 2013/0211555 A1* | 8/2013 | Lawson | G06F 9/5072 |
| | | | 700/28 |

(Continued)

FOREIGN PATENT DOCUMENTS

EP 1958738 A1 8/2008

OTHER PUBLICATIONS

International Search Report dated May 26, 2021; International Application No. PCT/EP2020/077808; 4 pages.

(Continued)

*Primary Examiner* — Jungwon Chang
(74) *Attorney, Agent, or Firm* — CANTOR COLBURN LLP (57) ABSTRACT

A method for collecting and pushing data from an industrial robot controller to at least one data consumer operating a consumer server, implementing a consumer data format and communication protocol, the method including the following steps implemented by a control unit of the industrial robot controller:
command the data collector to collect data;
command the data collector to store the data in a generic data buffer, the data being stored in a generic format;
command the protocol and data adaptor to retrieve stored data from the generic data buffer, and to convert the retrieved data generic format into the consumer data format, and to push the converted data to the consumer server according to the consumer communication protocol.

16 Claims, 1 Drawing Sheet

(56) References Cited

U.S. PATENT DOCUMENTS

| | | | |
|---|---|---|---|
| 2014/0074286 A1 | 3/2014 | Geheb et al. | |
| 2015/0281356 A1* | 10/2015 | Maturana | G06F 9/5072 709/217 |
| 2016/0149996 A1 | 5/2016 | Eckert et al. | |
| 2018/0357334 A1* | 12/2018 | Chao | G06F 16/10 |
| 2019/0050414 A1* | 2/2019 | Maturana | G06F 8/38 |

OTHER PUBLICATIONS

Written Opinion dated May 26, 2021; International Application No. PCT/EP2020/077808; 9 pages.

* cited by examiner

METHOD FOR ENABLING INDUSTRIAL COLLECTOR TO SEND TELEMETRY DATA TO MULTIPLE CONSUMERS

CROSS REFERENCE TO RELATED APPLICATIONS

This application is a National Stage of PCT Application No. PCT/EP2020/077808 filed on Oct. 5, 2020, the entire contents of which is incorporated herein by reference thereto.

TECHNICAL FIELD

This invention relates to the field of data collectors for industrial robot controllers.

BACKGROUND

It is known, to collect data from external equipment outside of an industrial controller, by pulling collected data from multiple external clients, and to push telemetry and diagnostic data to a single predefined consumer in a specific data format, be it to a preconfigured server on premise or to a server hosted in the cloud, which can result in vendor lock-in.

There is a need for a low-cost and versatile solution to send data generated or collected by an industrial controller to multiple consumers based on different protocols and data formats, in particular when the data generated is not directly consumable via a web-browser.

BRIEF SUMMARY

To that end, the present disclosure provides a method for collecting and pushing data from an industrial robot controller to at least one data consumer operating a consumer server, said consumer server implementing a consumer data format and a consumer communication protocol associated to the at least one data consumer, the industrial robot controller being connected to said consumer server:
the industrial robot controller comprising:
  a data collector configured to collect and store data,
  a protocol and data adaptor configured to retrieve stored data and to push retrieved data to the consumer server,
  a control unit configured to control the data collector and the protocol and data adaptor,
the method comprising the following steps implemented by a control unit of the industrial robot controller:
  command the data collector to collect data;
  command the data collector to store the data in a generic data buffer, the data being stored in a generic format;
  command the protocol and data adaptor to retrieve stored data from the generic data buffer, and to convert the retrieved data generic format into the consumer data format, and to push the converted data to the consumer server according to the consumer communication protocol.

According to an embodiment, the present disclosure comprises one or more of the following features, alone or in any combination technically compatible.

According to an embodiment, the at least one data consumer comprises a plurality of data consumers, each data consumer of the plurality of data consumers operating a consumer server of a plurality of consumer servers, said consumer server implementing a consumer data format and a consumer communication protocol associated to said data consumer from the plurality of data consumers, the industrial robot controller being connected in parallel to each consumer server of the plurality of consumer servers, the sub-steps of converting the retrieved data generic format and pushing the converted data to the consumer server being executed in parallel for each consumer server of the plurality of consumer servers.

According to these provisions, it is possible to send data generated by an industrial robot controller to multiple consumers based on different protocols and data formats, in particular when the data generated is not directly consumable via a web-browser.

According to these provisions, instead of tying the industrial system to a single consumer, the method according to the present disclosure proposes to transfer data to multiple data consumers adapting the data to specific consumer based on the protocol supported the consumer. The present disclosure provides flexibility in adding new data consumers or choosing to which data consumers the data is pushed. Since the controller can push to multiple data consumers, this solution avoids vendor lock-in and also enables pushing data to on premise servers or local disk using different protocols and data formats.

According to an embodiment, the industrial robot controller is connected to an industrial robot server, and the method further comprises the following steps, implemented by the control unit:
  receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server;
  update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol.

According to these provisions, the industrial robot controller is updatable with new consumer protocol and/or with new consumer data format, and its versatility is increased.

According to an embodiment of the present disclosure, the industrial robot controller is connected to the consumer servers and/or to the industrial robot server through an extended network, such as internet, and/or through a local network, the connection being wireless or not.

According to an embodiment, the data collector comprises a plurality of data collector units, the step of commanding the data collector to collect data comprising a step of commanding a data collector unit to collect data from at least one source.

According to an embodiment of the present disclosure, the at least one source is one of a plurality of external sensors, external to the industrial robot controller, or one of a plurality of internal sensors, internal to the industrial robot controller, or one of a plurality of storage media.

According to an embodiment, the protocol and data adaptor comprises a connector management unit, and an updatable connector services unit, the updatable connector services unit comprising a list of supported connectors, each supported connector comprising a consumer communication protocol and a consumer data format, said consumer communication protocol and said consumer data format being implemented by a consumer server from the plurality of consumer servers, said consumer server being operated by a data consumer from the plurality of data consumers, the control unit being configured to control the connector management unit and the updatable connector services unit, the method further comprising the following step implemented by the control unit:

select at least two data consumers from the plurality of data consumers;

and wherein the step of commanding the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the sub-steps of converting the retrieved data generic format and pushing the converted data to the consumer server being executed in parallel for each consumer server of the plurality of consumer servers according to the at least two supported connectors, each of the at least two supported connectors corresponding to one of the consumer servers, said one of the consumer servers being operated by one of the at least two selected data consumers.

According to an embodiment, the method further comprises a step of updating the updatable connector services unit by upgrading one of the supported connectors, and/or by adding a new connector comprising the new consumer communication protocol and/or the new consumer data format on request from the control unit, after the step of receiving, by the control unit, of a request from the industrial robot server to update the protocol and data adaptor with an upgraded consumer data format and/or with an upgraded consumer communication protocol and/or with a new consumer communication protocol and/or with a new consumer data format.

According to another aspect, the present disclosure provides an industrial robot controller comprising:

a data collector configured to collect and store data, a protocol and data adaptor configured to retrieve stored data and to push retrieved data to at least one consumer server operated by a data consumer among a plurality of data consumers, a control unit configured to control the data collector and the protocol and data adaptor, the control unit being configured to implement a method according to anyone of the embodiments described hereinabove.

According to an embodiment, the present disclosure comprises one or more of the following features, alone or in any combination technically compatible.

According to an embodiment, the industrial robot controller is connected to an industrial robot server.

According to an embodiment, the protocol and data adaptor comprises a connector management unit, and an updatable connector services unit, the updatable connector services unit comprising a list of supported connectors, a supported connector of the list comprising a consumer communication protocol and a consumer data format, said consumer communication protocol and said consumer data format corresponding to the consumer server operated by the consumer among the plurality of data consumers, and the control unit is configured to implement a method according to anyone of the embodiments described hereinabove.

BRIEF DESCRIPTION OF THE DRAWINGS

The foregoing and other purposes, features, aspects and advantages of the present disclosure will become apparent from the following detailed description of embodiments, given by way of illustration and not limitation with reference to the accompanying drawings, in which the same reference refer to similar elements or to elements having similar functions, and in which.

DETAILED DESCRIPTION

An architecture of the software modules of an industrial robot controller configured to implement the method according to an embodiment of the present disclosure, will be described in reference to FIG. 1.

The industrial robot comprises hardware modules controlled by an industrial robot controller IRC comprising different hardware and/or software modules, which will now be described functionnally.

In particular, the industrial robot controller comprises a data collector DC that is configured to collect data, such as for example, telemetry data, events data, alarms, and files. The data collector DC also comprises a buffer GDB, configured to store the collected data with a generic format.

The data collector DC may comprise a plurality of data collector units DC1, DC2, DC3, each data collector unit being dedicated to the collection of specific kind of data, for instance data stored as files on one or more storage media, or data measured by sensors embedded in the industrial robot controller IRC, for example temperature data, pressure data, etc, or data relative to a position, velocity, or acceleration, of a part of the industrial robot.

The data is stored in the buffer GDB continuously.

The data collector units DC1, DC2, DC3 may be configured with a data profile which defines what data to push and when to push it.

The industrial robot controller IRC also comprises a protocol and data adaptor PDA module, configured to retrieve stored data and to push retrieved data to at least one consumer server CS1, CS2, CS3, the at least one consumer server CS1, CS2, CS3 being operated by a consumer.

The industrial robot controller IRC is configured to be connected and to communicate with the at least one consumer server CS1, CS2, CS3, according to a protocol and data adaptor PDA.

The industrial robot controller may also be connected and configured to communicate with an industrial robot server IRS, the industrial robot server being configured to receive requests from consumers, and to send requests to the industrial robot controller IRC.

The industrial robot controller IRC is connected to the consumer servers CS1, CS2, CS3 and/or to the industrial robot server IRS through an extended network NL, such as internet, and/or through a local network, the connection being wireless or not. The industrial robot controller IRC is trusted, i.e. recognized as trustful, to the industrial robot server IRS. The industrial robot controller IRC is continuously looking from update to the industrial robot server IRS.

The industrial robot controller IRC further comprises a control unit CU configured to operationally control the data collector DC and the protocol and data adaptor PDA. The control unit may be part of the protocol and data adaptor PDA, as represented on FIG. 1, or outside of the protocol and data adaptor PDA.

Figure 2:
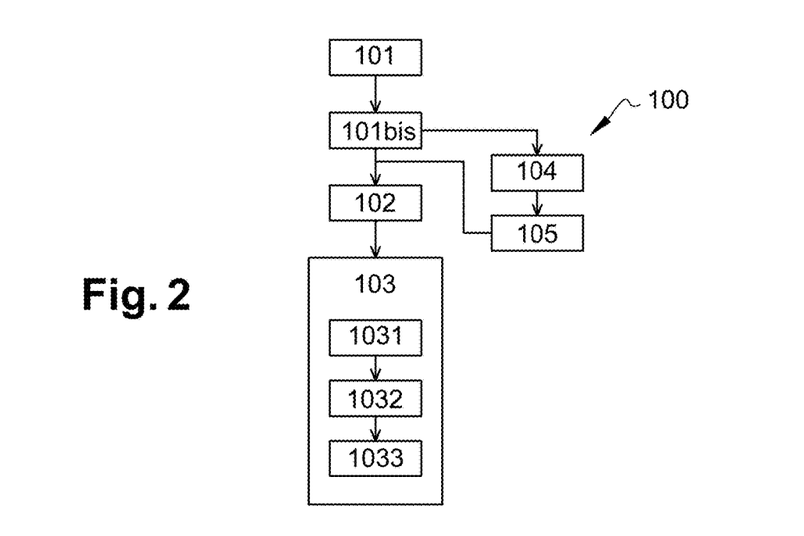
FIG. 2 is a schematic representation of the sequence of steps of an embodiment of a method according to the present disclosure.

A illustrated in FIG. 2, the method 100 according to an embodiment of the present disclosure for collecting and pushing data from the industrial robot controller IRC to at least one data consumer operating a consumer server CS1, CS2, CS3, comprises the following steps implemented by a control unit CU of the industrial robot controller IRC:
  command the data collector DC to collect 101 data;
  command the data collector DC to store 102 the data in a generic data buffer GDB, the data being stored in a generic format;
  command 103 the protocol and data adaptor PDA to retrieve 1031 stored data from the generic data buffer GDB, and to convert 1032 the retrieved data generic format into the consumer data format CF1, CF2, CF3, and to push 1033 the converted data to the consumer server CS1, CS2, CS3 according to the consumer communication protocol CP1, CP2, CP3.

As a further example, the at least one data consumer may comprise a plurality of data consumers; in this case, the sub-steps of converting 1032 the retrieved data generic format and pushing 1033 the converted data to the consumer server CS1, CS2, CS3 may be executed in parallel for each consumer server of the plurality of consumer servers CS1, CS2, CS3.

Figure 1:
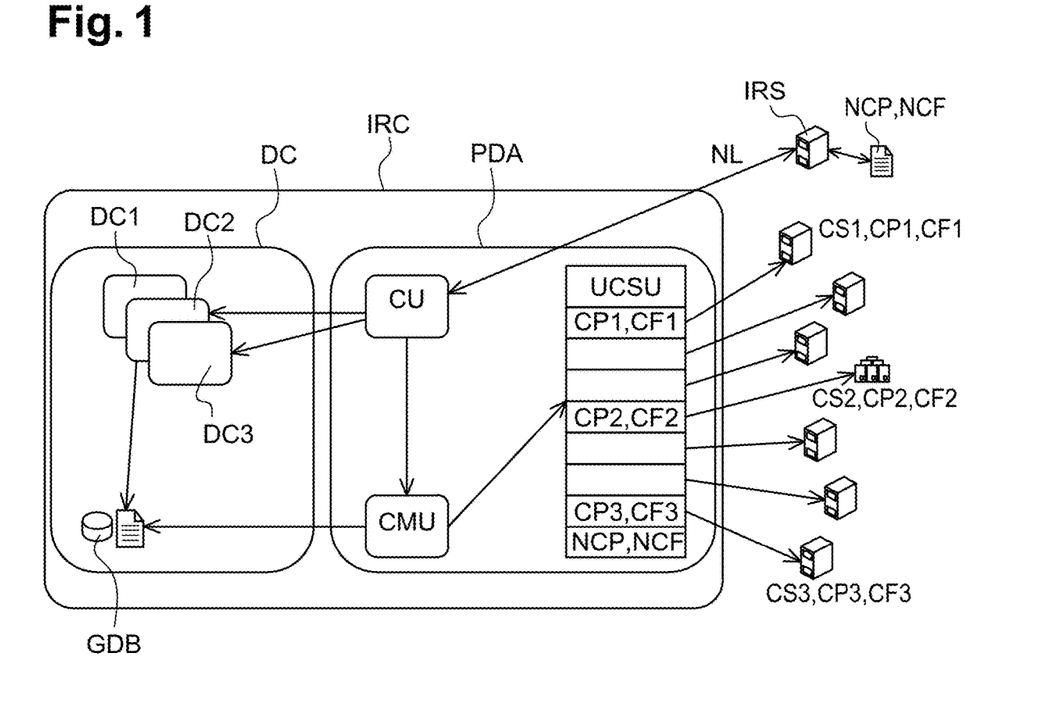
FIG. 1 is a schematic representation of an architecture of the software modules of an industrial robot controller configured to implement a method according to an embodiment the present disclosure.

According to a particular embodiment illustrated on FIG. 1, the protocol and data adaptor PDA may comprise a connector management unit CMU, and an updatable connector services unit UCSU. Said updatable connector services unit UCSU comprises a list of supported connectors (CP1, CF1), (CP2, CF2), (CP3,CF3), wherein a supported connector of the list comprises a consumer communication protocol CP1, CP2, CP3 and a consumer data format CF1, CF2, CF3; said consumer communication protocol CP1, CP2, CP3 and said consumer data format CF1, CF2, CF3 are corresponding to a consumer server CS1, CS2, CS3 operated by one of the multiple consumers. Each supported connector is configured to transform the data and push the data to the consumer server according to the consumer communication protocol CP1, CP2, CP3 and to consumer data format CF1, CF2, CF3 of the supported connector, as expected by said consumer server.

Consumer communication protocols CP1, CP2, CP3 may be predefined standards such as MQTT/S, HTTPS/S, FTP/S, MS 1OT, AWS 1OT, etc. It is also possible to develop a new supported connector specific to a consumer, and to update accordingly the updatable connector services unit UCSU of the protocol and data adaptor PDA, as described hereinbelow. It is also possible to upgrade an existing supported connector (CP1, CF1), (CP2, CF2), (CP3, CF3), and to update accordingly the updatable connector services unit UCSU of the protocol and data adaptor PDA.

The control unit CU is configured to control the connector management unit CMU and the updatable connector services unit UCSU of the protocol and data adaptor PDA.

The connector management unit CMU is configured to extract data stored in the buffer GDB and to send the data to the updatable connector services unit UCSU, which is itself configured to implement the appropriate supported connector, in order to transform the data and push the data to the consumer server according to said appropriate supported connector, i.e. according to the consumer communication protocol CP1, CP2, CP3 and to consumer data format CF1, CF2, CF3 of the supported connector.

The industrial robot controller IRC is thus able to send data to at least one consumer server according to the supported connector, installed in the updatable connector services unit UCSU, the supported connector being selected according to the consumer communication protocol CP1, CP2, CP3 and to consumer data format CF1, CF2, CF3 expected by said at least one consumer server.

The industrial robot controller IRC is also able to send data in parallel to a plurality of consumer servers CS1, CS2, CS3 according to a plurality of supported connectors (CP1, CF1), (CP2, CF2), (CP3, CF3), installed in the updatable connector services unit UCSU, each supported connector of the plurality of supported connectors (CP1, CF1), (CP2, CF2), (CP3, CF3) being selected according to the consumer communication protocol CP1, CP2, CP3 and to consumer data format CF1, CF2, CF3 expected by each consumer server from the plurality of consumer servers CS1, CS2, CS3.

When a data is successfully sent to all consumers or after a time-out the data is removed from the buffer.

The updatable connector services unit UCSU is updatable over the air. Namely, when a consumer connected to the industrial robot server IRS requests a new connector to be supported, and if the request is compliant with some service level agreement defining the kind of protocol/format which may be supported, the industrial robot server IRS may send a request to the control unit CU to have the updatable connector services unit UCSU updated with the new connector, comprising for instance a new consumer data format NCF, and/or a new consumer communication protocol NCP. When trustfully requested by the industrial robot server IRS, the industrial robot controller IRC downloads the protocol/data adaptor and adds it to the list of currently supported protocol/data adapter of the updatable connector unit UC.

Thus new supported connector (NCF, NCP) or the upgraded existing supported connector (CP1, CF1), (CP2, CF2), (CP3, CF3) can be added dynamically and over the air to adaptd to new data consumers in the field.

The data profile associated with data collected by the data collector units DC1, DC2, DC3, is also updatable over the air according to consumer demand via the industrial robot server IRS.

Protocol/data adaptor supported by the industrial robot controller IRC may be published on the industrial robot server IRS, for consultation by the consumers. As indicated hereinabove, a service level agreement accessible to consumers on the industrial robot server IRS, will define the protocol/data adaptor supported by the industrial robot controller IRC.

The consumer servers CS1, CS2, CS3 may be generic servers or consumer specific.

The consumer server CS1, CS2, CS3 is defined by the protocol supported and by the server accessibility, configuration and security parameters.

The industrial robot controller IRC must have loaded in the updatable connector services unit UCSU, the protocol/data adaptor, or supported connector, which match the consumer server targeted by the step of pushing data.

The industrial robot controller IRC must load a supported connector defined on the industrial robot server IRS containing the consumer communication protocol CP1, CP2, CP3 and the consumer data format CF1, CF2, CF3 of the supported connector, and the server security access parameters.

According to an aspect of the present disclosure, the present disclosure also relates to an industrial robot controller IRC comprising:
- a data collector DC configured to collect and store data,
- a protocol and data adaptor PDA configured to retrieve stored data and to push retrieved data to at least one consumer server CS1, CS2, CS3 operated by a data consumer among multiple data consumers,
- a control unit CU configured to control the data collector DC and the protocol and data adaptor PDA, the control unit CU being configured to implement the method as previously described.

In particular, the industrial robot controller IRC, is connected to an industrial robot server IRS and the control unit CU is further configured to implement the following steps:
- receive 104 a request from the industrial robot server IRS to update the protocol and data adaptor PDA by upgrading the consumer data format (CF1, CF2, CF3) and/or by upgrading the consumer communication protocol (CP1, CP2, CP3) implemented by the consumer server (CS1, CS2, CS3), and/or by adding a new consumer communication protocol NCP and/or with a new consumer data format NCF, the new consumer communication protocol NCP and/or the new consumer data format NCF being implemented by a new consumer server;
- update 105 the protocol and data adaptor PDA with the upgraded consumer data format (CF1, CF2, CF3) and/or with the upgraded consumer communication protocol (CP1, CP2, CP3), and/or with the new consumer communication protocol NCP and/or with the new consumer data format NCF, so that the protocol and data adaptor PDA is configured to convert retrieved data into the upgraded consumer data format (CF1, CF2, CF3) and/or into the new consumer data format NCF, and to push the converted data to the consumer server (CS1, CS2, CS3) according to the upgraded consumer communication protocol (CP1, CP2, CP3) and/or to the new consumer server according to the new consumer communication protocol NCP.

Step of receiving (104) a request from the industrial robot server IRS to update the protocol and data adaptor PDA should be executed before step of updating (105), which should be executed before sub-steps of converting 1032 the retrieved data generic format into the consumer data format CF1, CF2, CF3, and of pushing 1033 the converted data to the consumer server CS1, CS2, CS3 according to the consumer communication protocol CP1, CP2, CP3, if these sub-steps should use the updated consumer data format and/or the updated consumer data protocol. Apart from this constraint, the step of updating (105) may be executed in any order with respect to other steps of the method according to the present disclosure.

More particularly, the protocol and data adaptor PDA of the industrial robot controller comprises a connector management unit CMU, and an updatable connector services unit UCSU, the updatable connector services unit UCSU comprising a list of supported connectors (CP1, CF1), (CP2, CF2), (CP3,CF3), a supported connector of the list comprising a consumer communication protocol CP1, CP2, CP3 and a consumer data format CF1, CF2, CF3, said consumer communication protocol CP1, CP2, CP3 and said consumer data format CF1, CF2, CF3 corresponding to a consumer server CS1, CS2, CS3 operated by a consumer among a plurality of consumers, and the control unit CU is configured to implement the following steps:
- select 101b is at least one consumer among the multiple consumers;
- command the connector management unit CMU to retrieve stored data from the generic data buffer, and to push the retrieved data according to the supported connector (CP1, CF1), (CP2, CF2), (CP3,CF3) corresponding to the at least one consumer server CS1, CS2, CS3 operated by said at least one selected consumer, the connector management unit CMU being configured to command the updatable connector services unit UCSU to convert the retrieved stored data generic format into the consumer data format CF1, CF2, CF3, and to push the converted retrieved stored data to the at least one consumer server CS1, CS2, CS3 according to the consumer communication protocol CP1, CP2, CP3.
- update 105 the updatable connector services unit UCSU by upgrading one of the supported connectors (CP1, CF1), (CP2, CF2), (CP3,CF3), or by adding a new connector NCP, NCF comprising the new consumer communication protocol NCP and/or the new consumer data format NCF on request from the control unit CU, after having received a request 104 from the industrial robot server IRS to update the protocol and data adaptor PDA.

Step of selecting 101 bis at least one consumer may be executed before or after any other steps of the method according to the present disclosure, apart from that it must obviously be executed before sub-steps of converting 1032 the retrieved data generic format into the consumer data format CF1, CF2, CF3, and of pushing 1033 the converted data to the consumer server CS1, CS2, CS3 according to the consumer communication protocol CP1, CP2, CP3, so that the consumer server CS1, CS2, CS3, and the consumer data format CF1, CF2, CF3, the consumer communication protocol CP1, CP2, CP3 can be identified before executing these sub-steps.

According to a further aspect, the present disclosure concerns also an Industrial robot controller IRC comprising:
- a data collector DC configured to collect and store data,
- a protocol and data adaptor PDA configured to retrieve stored data and to push retrieved data to at least one consumer server CS1, CS2, CS3 operated by a data consumer among a plurality of data consumers,
- a control unit CU configured to control the data collector DC and the protocol and data adaptor PDA, the control unit CU being configured to implement a method according to any of the embodiments described herein above.

Glossary for Abbreviations and References to the Drawings

CMU: Connector Management Unit
CU: Control Unit
CS1, CS2, CS3: Consumer Servers
CP1, CP2, CP3: Communication Protocol
CF1, CF2, CF3: Consumer data Format
DC: Data Collector
GDB: Generic Data Buffer
IRC: Industrial Robot Controller
IRS: Industrial Robot Server
PDA: Protocol and Data Adaptor
NL: Network Link
NCP: New Communication Protocol
NCF: New Consumer data Format
UCSU: Updatable Connector Services Unit

The invention claimed is:

1. A method for collecting and pushing data from an industrial robot controller to at least one data consumer operating a consumer server, the consumer server implementing a consumer data format and a consumer communication protocol associated to the at least one data consumer, the industrial robot controller being connected to the consumer server:
the industrial robot controller comprising:
a data collector configured to collect and store data,
a protocol and data adaptor configured to retrieve stored data and to push retrieved data to the consumer server,
a control unit configured to control the data collector and the protocol and data adaptor,
the method comprising the following steps implemented by a control unit of the industrial robot controller:
command the data collector to collect data;
command the data collector to store the data in a generic data buffer, the data being stored in a generic format;
command the protocol and data adaptor to retrieve stored data from the generic data buffer, and to convert the retrieved data generic format into the consumer data format, and to push the converted data to the consumer server according to the consumer communication protocol, wherein the at least one data consumer comprises a plurality of data consumers, each data consumer of the plurality of data consumers operating a consumer server of a plurality of consumer servers, the consumer server implementing a consumer data format and a consumer communication protocol associated to the data consumer from the plurality of data consumers, the industrial robot controller being connected in parallel to each consumer server of the plurality of consumer servers, the steps of convert the retrieved data generic format and push the converted data to the consumer server being executed in parallel for each consumer server of the plurality of consumer servers,
wherein the protocol and data adaptor comprises a connector management unit, and an updatable connector services unit, the updatable connector services unit comprising a list of supported connectors, each supported connector comprising a consumer communication protocol and a consumer data format, the consumer communication protocol and the consumer data format being implemented by a consumer server from the plurality of consumer servers, the consumer server being operated by a data consumer from the plurality of data consumers, the control unit being configured to control the connector management unit and the updatable connector services unit, the method further comprising the following step implemented by the control unit:
select at least two data consumers from the plurality of data consumers; and wherein the step of command the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the steps of convert the retrieved data generic format and push the converted data to the consumer server being executed in parallel for each consumer server of the plurality of consumer servers according to the at least two supported connectors, each of the at least two supported connectors corresponding to one of the plurality of consumer servers, the one of the plurality of consumer servers being operated by one of the at least two selected data consumers.

2. The method according to claim 1, wherein the industrial robot controller is connected to an industrial robot server, the method further comprising the following steps, implemented by the control unit:
receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server;
update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol.

3. The method according to claim 2, wherein the data collector comprises a plurality of data collector units, the step of command the data collector to collect data comprising a step of commanding a data collector unit to collect data from at least one source.

4. The method according to claim 3, wherein the industrial robot controller is connected to an industrial robot server and the method further comprising the following steps, implemented by the control unit: receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server; update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol and further comprising a step of updating the updatable connector services unit by upgrading one supported connector, and/or by adding a new connector comprising the new consumer communication protocol and/or the new consumer data format on request from the control unit, after the step of receiving, by the control unit, of a request from the industrial robot server to update the protocol and data adaptor with an upgraded consumer data format and/or with an upgraded consumer communication protocol and/or with a new consumer communication protocol and/or with a new consumer data format.

5. The method according to claim 2, wherein the industrial robot controller is connected to an industrial robot server and the method further comprising the following steps, implemented by the control unit: receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server; update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol and further comprising a step of updating the updatable connector services unit by upgrading one supported connector, and/or by adding a new connector comprising the new consumer communication protocol and/or the new consumer data format on request from the control unit, after the step of receiving, by the control unit, of a request from the industrial robot server to update the protocol and data adaptor with an upgraded consumer data format and/or with an upgraded consumer communication protocol and/or with a new consumer communication protocol and/or with a new consumer data format.

6. The method according to claim 1, wherein the data collector comprises a plurality of data collector units, the step of command the data collector to collect data comprising a step of commanding a data collector unit to collect data from at least one source.

7. The method according to claim 6, wherein the industrial robot controller is connected to an industrial robot server and the method further comprising the following steps, implemented by the control unit: receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server; update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol and further comprising a step of updating the updatable connector services unit by upgrading one supported connector, and/or by adding a new connector comprising the new consumer communication protocol and/or the new consumer data format on request from the control unit, after the step of receiving, by the control unit, of a request from the industrial robot server to update the protocol and data adaptor with an upgraded consumer data format and/or with an upgraded consumer communication protocol and/or with a new consumer communication protocol and/or with a new consumer data format.

8. The method according to claim 1, wherein the industrial robot controller is connected to an industrial robot server and the method further comprising the following steps, implemented by the control unit: receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server; update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol and further comprising a step of updating the updatable connector services unit by upgrading one supported connector, and/or by adding a new connector comprising the new consumer communication protocol and/or the new consumer data format on request from the control unit, after the step of receiving, by the control unit, of a request from the industrial robot server to update the protocol and data adaptor with an upgraded consumer data format and/or with an upgraded consumer communication protocol and/or with a new consumer communication protocol and/or with a new consumer data format.

9. An industrial robot controller comprising:
a data collector configured to collect and store data,
a protocol and data adaptor configured to retrieve stored data and to push retrieved data to at least one consumer server operated by a data consumer among a plurality of data consumers,
a control unit configured to control the data collector and the protocol and data adaptor,
the control unit being configured to implement a method according to claim 1.

10. The industrial robot controller according to claim 9, wherein the industrial robot controller is connected to an industrial robot server and wherein the method further comprises the following steps, implemented by the control unit: receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server; update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol.

11. The industrial robot controller according to claim 9, wherein the industrial robot controller is connected to an industrial robot server and the protocol and data adaptor comprises a connector management unit, and an updatable connector services unit, the updatable connector services unit comprising a list of supported connectors, a supported connector of the list of supported connectors comprising a consumer communication protocol and a consumer data format, the consumer communication protocol and the consumer data format corresponding to the at least one consumer server operated by the at least one data consumer among the plurality of data consumers, and wherein the at least one data consumer comprises a plurality of data consumers, each data consumer of the plurality of data consumers operating a consumer server of a plurality of consumer servers, the consumer server implementing a consumer data format and a consumer communication protocol associated to the at least one data consumer from the plurality of data consumers, the industrial robot controller being connected in parallel to each consumer server of the plurality of consumer servers, the steps of convert the retrieved data generic format and push the converted data to the consumer server being executed in parallel for each consumer server of the plurality of consumer servers and the method further comprises the following steps, implemented by the control unit: select at least two data consumers from the plurality of data consumers;

and wherein the step of command the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the steps of convert the retrieved data generic format and push the converted data to the consumer server being executed in parallel for each consumer server of the plurality of consumer servers according to the at least two supported connectors, each of the at least two supported connectors corresponding to one of the plurality of consumer servers, the one of the plurality of consumer servers being operated by one of the at least two selected data consumers.

12. A method for collecting and pushing data from an industrial robot controller to at least one data consumer operating a consumer server, the consumer server implementing a consumer data format and a consumer communication protocol associated to the at least one data consumer, the industrial robot controller being connected to the consumer server:

the industrial robot controller comprising:
a data collector configured to collect and store data,
a protocol and data adaptor configured to retrieve stored data and to push retrieved data to the consumer server,
a control unit configured to control the data collector and the protocol and data adaptor,
the method comprising the following steps implemented by a control unit of the industrial robot controller:
command the data collector to collect data;
command the data collector to store the data in a generic data buffer, the data being stored in a generic format;
command the protocol and data adaptor to retrieve stored data from the generic data buffer, and to convert the retrieved data generic format into the consumer data format, and to push the converted data to the consumer server according to the consumer communication protocol,
wherein the industrial robot controller is connected to an industrial robot server, the method further comprising the following steps, implemented by the control unit:
receive a request from the industrial robot server to update the protocol and data adaptor by upgrading the consumer data format and/or by upgrading the consumer communication protocol implemented by the consumer server, and/or by adding a new consumer communication protocol and/or with a new consumer data format, the new consumer communication protocol and/or the new consumer data format being implemented by a new consumer server;
update the protocol and data adaptor with the upgraded consumer data format and/or with the upgraded consumer communication protocol, and/or with the new consumer communication protocol and/or with the new consumer data format, so that the protocol and data adaptor is configured to convert retrieved data into the upgraded consumer data format and/or into the new consumer data format, and to push the converted data to the consumer server according to the upgraded consumer communication protocol and/or to the new consumer server according to the new consumer communication protocol, wherein the protocol and data adaptor comprises a connector management unit, and an updatable connector services unit, the updatable connector services unit comprising a list of supported connectors, each supported connector comprising a consumer communication protocol and a consumer data format, the consumer communication protocol and the consumer data format being implemented by a consumer server from a plurality of consumer servers, the consumer server being operated by a data consumer from a plurality of data consumers, the control unit being configured to control the connector management unit and the updatable connector services unit, the method further comprising the following step implemented by the control unit:
select at least two data consumers from the plurality of data consumers; and wherein the step of command the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the steps of convert the retrieved data generic format and push the converted data to the consumer server being executed in parallel for each consumer server of the plurality of consumer servers according to the at least two supported connectors, each of the at least two supported connectors corresponding to one of the plurality of consumer servers, the one of the plurality of consumer servers being operated by one of the at least two selected data consumers.

13. The method according to claim 12, wherein the data collector comprises a plurality of data collector units, the step of command the data collector to collect data comprising a step of commanding a data collector unit to collect data from at least one source.

14. A method for collecting and pushing data from an industrial robot controller to at least one data consumer operating a consumer server, the consumer server implementing a consumer data format and a consumer communication protocol associated to the at least one data consumer, the industrial robot controller being connected to the consumer server:
the industrial robot controller comprising:
a data collector configured to collect and store data,
a protocol and data adaptor configured to retrieve stored data and to push retrieved data to the consumer server,
a control unit configured to control the data collector and the protocol and data adaptor,
the method comprising the following steps implemented by a control unit of the industrial robot controller:
command the data collector to collect data;
command the data collector to store the data in a generic data buffer, the data being stored in a generic format;
command the protocol and data adaptor to retrieve stored data from the generic data buffer, and to convert the retrieved data generic format into the consumer data format, and to push the converted data to the consumer server according to the consumer communication protocol, wherein the data collector comprises a plurality of data collector units, the step of command the data collector to collect data comprising a step of commanding a data collector unit to collect data from at least one source, wherein the protocol and data adaptor comprises a connector management unit, and an updatable connector services unit, the updatable connector services unit comprising a list of supported connectors, each supported connector comprising a consumer communication protocol and a consumer data format, the consumer communication protocol and the consumer data format being implemented by a consumer server from a plurality of consumer servers, the consumer server being operated by a data consumer from a plurality of data consumers, the control unit being configured to control the connector management unit and the updatable connector services unit, the method further comprising the following step implemented by the control unit:
select at least two data consumers from the plurality of data consumers; and wherein the step of command the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the steps of convert the retrieved data generic format and push the converted data to the consumer server being executed in parallel for each consumer server of the plurality of consumer servers according to the at least two supported connectors, each of the at least two supported connectors corresponding to one of the plurality of consumer servers, the one of the plurality of consumer servers being operated by one of the at least two selected data consumers.

15. The method according to claim 14, wherein the at least one data consumer comprises a plurality of data consumers, each data consumer of the plurality of data consumers operating a consumer server of a plurality of consumer servers, the consumer server implementing a consumer data format and a consumer communication protocol associated to the data consumer from the plurality of data consumers, the industrial robot controller being connected in parallel to each consumer server of the plurality of consumer servers, the steps of convert the retrieved data generic format and push the converted data to the consumer server being executed in parallel for each consumer server of the plurality of consumer servers.

16. An industrial robot controller comprising:
a data collector configured to collect and store data,
a protocol and data adaptor configured to retrieve stored data and to push retrieved data to at least one consumer server operated by a data consumer among a plurality of data consumers,
a control unit configured to control the data collector and the protocol and data adaptor,
the control unit being configured to implement a method for collecting and pushing data from the industrial robot controller to at least one data consumer operating a consumer server, the consumer server implementing a consumer data format and a consumer communication protocol associated to the at least one data consumer, the industrial robot controller being connected to the consumer server:
the industrial robot controller comprising:
a data collector configured to collect and store data,
a protocol and data adaptor configured to retrieve stored data and to push retrieved data to the consumer server,
a control unit configured to control the data collector and the protocol and data adaptor,
the method comprising the following steps implemented by a control unit of the industrial robot controller:
command the data collector to collect data;
command the data collector to store the data in a generic data buffer, the data being stored in a generic format;
command the protocol and data adaptor to retrieve stored data from the generic data buffer, and to convert the retrieved data generic format into the consumer data format, and to push the converted data to the consumer server according to the consumer communication protocol,
wherein the industrial robot controller is connected to an industrial robot server and the protocol and data adaptor comprises a connector management unit, and an updatable connector services unit, the updatable connector services unit comprising a list of supported connectors, a supported connector of the list of supported connectors comprising a consumer communication protocol and a consumer data format, the consumer communication protocol and the consumer data format corresponding to the consumer server operated by the data consumer among the plurality of data consumers, and wherein the at least one data consumer comprises a plurality of data consumers, each data consumer of the plurality of data consumers operating a consumer server of a plurality of consumer servers, the consumer server implementing a consumer data format and a consumer communication protocol associated to the data consumer from the plurality of data consumers, the industrial robot controller being connected in parallel to each consumer server of the plurality of consumer servers, the steps of convert the retrieved data generic format and push the converted data to the consumer server being executed in parallel for each consumer server of the plurality of consumer servers and the method further comprises the following steps, implemented by the control unit: select at least two data consumers from the plurality of data consumers;

and wherein the step of command the protocol and data adaptor comprises commanding the connector management unit to retrieve stored data from the generic data buffer and commanding the connector management unit to command the updatable connector services unit to convert the retrieved stored data generic format into the consumer data format of each one of at least two supported connectors, and to push the converted retrieved data to the consumer server according to the consumer communication protocol of each one of the at least two supported connectors, the steps of convert the retrieved data generic format and push the converted data to the consumer server being executed in parallel for each consumer server of the plurality of consumer servers according to the at least two supported connectors, each of the at least two supported connectors corresponding to one of the plurality of consumer servers, the one of the plurality of consumer servers being operated by one of the at least two selected data consumers.

* * * * *